Oct. 3, 1961 C. E. FONTAINE 3,002,623
SCREEN ATTACHMENT FOR CEMENT MIXERS
Filed March 27, 1959 2 Sheets-Sheet 1

Charles E. Fontaine
INVENTOR.

BY *Clarence A. O'Brien*
*and Harvey B. Jacobson*
Attorneys

Oct. 3, 1961 — C. E. FONTAINE — 3,002,623
SCREEN ATTACHMENT FOR CEMENT MIXERS
Filed March 27, 1959 — 2 Sheets-Sheet 2
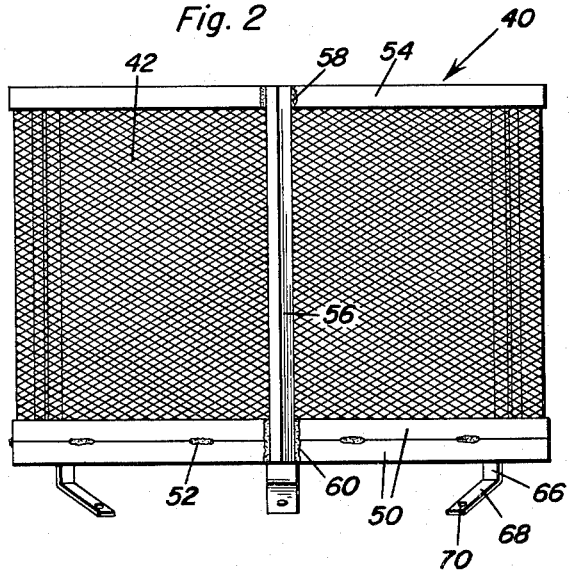
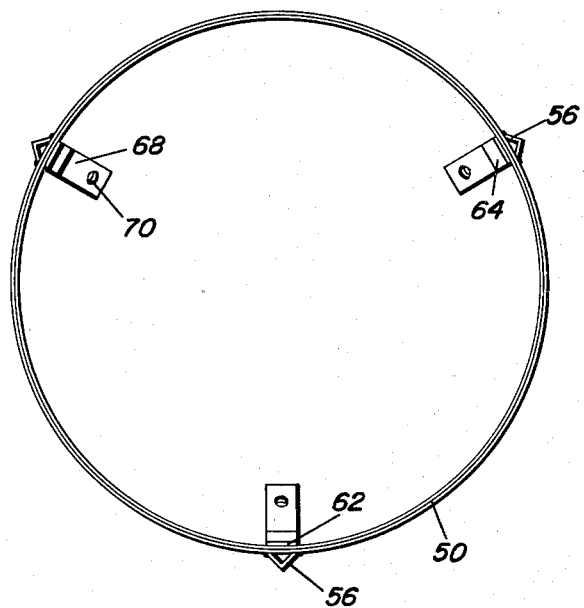
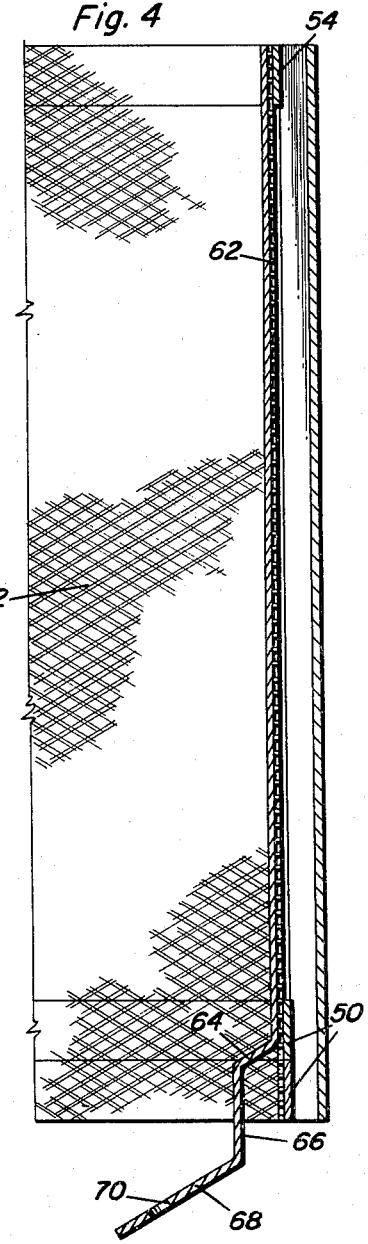
Charles E. Fontaine
INVENTOR.

United States Patent Office 3,002,623
Patented Oct. 3, 1961

3,002,623
SCREEN ATTACHMENT FOR CEMENT MIXERS
Charles E. Fontaine, Nashua St., Leominster, Mass.
Filed Mar. 27, 1959, Ser. No. 802,496
11 Claims. (Cl. 209—288)

This invention comprises a novel and useful screen attachment for cement mixers and more particularly relates to an adapter screen adapted to replace the customary rotating drum or tumbling barrel of a cement mixer whereby the cement mixer may be converted into an apparatus constituting a rotary screen or sifter for screening or sifting various loose materials such as sand, loam, manure or sod, grain or the like.

There are now in common use a considerable number of small semi-portable cement mixers in which a rotary drum or tumbling barrel is mounted upon a supporting stand and driven by a source of power. It is the primary purpose of this invention to provide an attachment for such an apparatus which will readily convert the same from the sole function of mixing materials to make use of the power rotating means to operate a rotary screen and thereby adapt the apparatus for the additional specific purpose of screening or sifting various types of materials.

A more specific object of the invention is to provide a screen attachment which may be readily applied to the conventional rotary base element of a rotary drum or tumbling barrel of a cement mixer or the like.

A further more specific object of the invention is to provide a conversion screen which is specifically adapted to replace the conventional rotary drum or tumbling barrel of a cement mixer and to be secured to the rotary base of the same by the same fastening means which formerly held the drum or barrel thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the screen attachment itself removed from its mounting upon the cement mixer;

FIGURE 3 is a bottom plan view of the screen of FIGURE 2;

FIGURE 4 is a fragmentary view in vertical section through a portion of the screen of FIGURES 2 and 3 and showing the supporting framework for the screening material and the attaching means whereby the screen is removably secured to the rotary base of the cement mixer.

Figure 1:
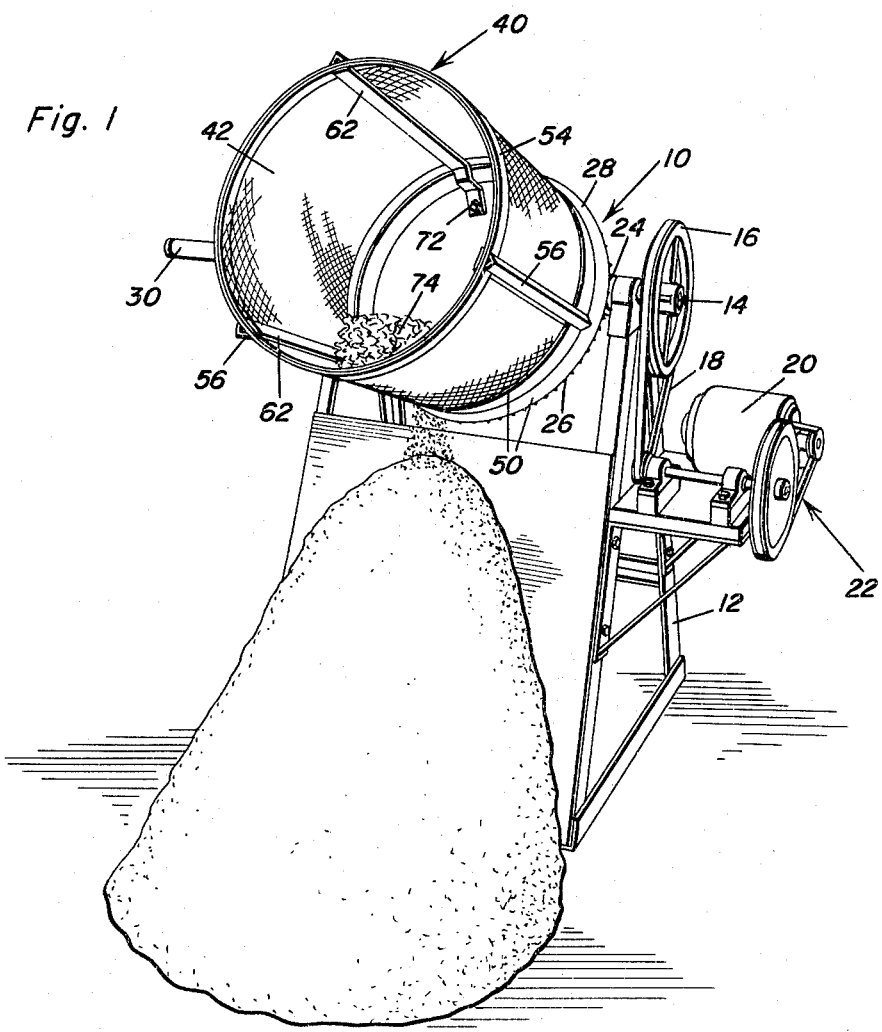
FIGURE 1 is a perspective view showing a conventional form of a cement mixer to which the screen attachment of the present invention has been applied and illustrating the use of the same.

Referring first to FIGURE 1 of the drawings it will be observed that the numeral 10 designates generally a conventional and well-known type of small capacity semi-portable cement mixer which are used by small contractors and by individuals for mixing cement and similar materials. Such a device includes the usual supporting framework 12 upon which is journalled the usual driving axle 14, powered as by a pulley wheels 16 and belt 18 from an electric motor 20 as through a suitable speed reducing device such as that indicated generally by the numeral 22.

Shaft 14 in turn has a gear 24 which drives a ring gear 26 carried by the circular base plate 28 upon which the usual rotary drum or tumbling barrel, not shown, of a cement mixer is supported. As will be readily understood, this base 28 is so supported upon the framework 12 and by means of a handle 30 its longitudinal axis of rotation may be tilted to an upwardly inclined position in which the material is kept within the barrel as the same rotates thereby tumbling the material therein, or into a downwardly inclined position whereby the material in the barrel may be discharged.

Inasmuch as the means for mounting the base 28 and supporting the same upon the framework 12 for both rotation about the axis of the tumbling barrel and for tilting this axis between an operative position and a dumping position is well known and forms no part of the invention claimed herein, a further description of the same is deemed to be unnecessary.

It is with a rotary base 28 of such an apparatus that the screen attachment of the present invention is specifically designed to coact.

Figure 5:
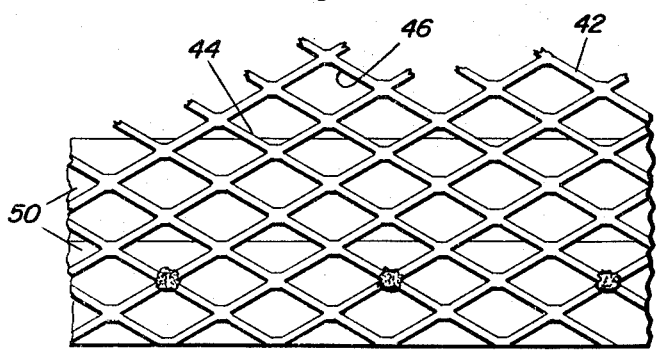
FIGURE 5 is a fragmentary plan view of the material of the screen.

Designated generally by the numeral 40 is the sifter or screen attachment of the present invention. As will be seen from a comparison of FIGURES 1–4, the screen 40 is preferably cylindrical or slightly conical in shape, and includes a sheet or sheets of a reticulated material shown at 42. Conveniently, this material as shown in FIGURE 5 may be a sheet of expanded metal so as to provide a series of criss-cross bar-like elements 44 forming diamond-shaped openings 46 therebetween. Obviously other suitable shapes and sizes of apertures can be provided, it being merely necessary that the screen shall be of such a mesh as to effectively carry out any desired screening operation.

The cylindrical screen thus formed by the material 42 is secured to a supporting framework in order to strengthen and rigidify its construction. Thus, there is provided a pair of lower annular rings or bands as at 50 which may be welded together as at 52 to thus effect a wider band. A similar band as at 54 is provided at the top end of the screen and it will be understood that intermediate bands could be similarly provided if desired.

The screening material 42 is disposed upon the interior of these bands as will be readily apparent from FIGURE 4 in conjunction with FIGURE 1. A plurality of vertically extending reinforcing members 56 which are preferably angulated in cross section as shown in FIGURE 3 are welded at their upper and lower ends as at 58 and 60 to the upper and lower bands 54 and 50, 52 upon the exterior of these bands. The members 56, three being shown in FIGURE 3, thus serve to rigidly connect the upper and lower bands to each other and also serve to support the intermediate region of the cylindrical screen. Obviously any desired number of such reinforcing members could be provided as desired.

Further reinforcing members in the form of vertically extending flat straps 62 are secured to the inside of the cylindrical screen material 42 and against the inside of the outer reinforcing members 56 and welding may be again conveniently employed for this purpose. Thus, the screen material 42 is clamped and firmly held between the inside of reinforcing members 62 and the exterior reinforcing members 56.

The inside members 62 also serve in addition to their functions as reinforcing means and clamping means for retaining the screen material against the outer members 56, as a mounting means whereby the entire device is mounted upon the bottom or rotary base 28 of the mixer barrel or drum. For this purpose, the lower ends of the members 62 are provided with downwardly and inwardly inclined angulated portions 64 which in turn have downwardly extending legs 66 parallel to the members 62 and 56, and which at their lower ends again terminate in downwardly and inclined end portions 68 which are substantially parallel to but project below and inwardly of the previously mentioned portions 64. These last mentioned end portions 68 are provided with apertures 70 which are adapted to receive conventional fastening bolts 72 by which the rotary drum or tumbling barrel of the conventional cement mixer was secured to its base 28.

As so far described it will now be apparent that the mixing drum or barrel of the mixer can be disconnected from its supporting rotary base 28 by removing the three bolts 72, whereupon the screen 40 of this invention may be substituted in place thereof. When so substituted, the power driving means of the mixer may be operated whereby upon rotation of the screen 40, the material thrown thereinto will be effectively sifted or screened as indicated in FIGURE 1. After the screening operation has been completed, and the material removed, the screening barrel 40 may be lowered by the handle 30 to discharge the debris or unscreened remnant 74 of such material which remains within the screen 40 from the latter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is climed as new is as follows:

1. A rotary screen comprising an attachment for use with the base unit and power structure of a mixer of the type having a power operated rotary tumbling barrel consisting of a rotary disk-like base with a cylindrical drum and fasteners removably securing said drum thereon, said attachment comprising; a cylindrical screen open at both ends and consisting of a reticulated material, a support framework secured to and stiffening and reinforcing said material, said support framework being mounted upon and secured to said disk-like base as a replacement for the tumbling barrel and by the fasteners that connected said barrel to said base.

2. The combination of claim 1 wherein said cylindrical screen includes upper and lower rings secured to the two ends of the reticulated material and vertical braces secured to said rings and to said material.

3. The combination of claim 1 wherein said cylindrical screen includes upper and lower rings secured to the two ends of the reticulated material and vertical braces secured to said rings and to said material, said vertical braces being secured to the interior of said material.

4. The combination of claim 1 wherein said cylindrical screen includes upper and lower rings secured to the two ends of the reticulated material and vertical braces secured to said rings and to said material, said vertical braces each comprising a pair of members on opposite sides of said material and clamping the latter therebetween.

5. The combination of claim 4 wherein one member of each brace has an angulated end portion projecting downwardly and laterally of the wall of said screen for attachment to said base.

6. The combination of claim 5 wherein said angulated end portion is apertured for engagement by said fasteners and extends downwardly and laterally of the lower ring and edge of said screen.

7. The combination of claim 1 wherein said cylindrical screen includes upper and lower rings secured to the two ends of the reticulated material and outer and inner vertical braces secured, respectively, to said rings and to said material, and said outer vertical braces being V-shaped in cross-section.

8. The combination of claim 1 wherein said cylindrical screen includes upper and lower rings secured to the two ends of the reticulated material and vertical braces secured to said rings and to said material, said vertical braces being secured to the interior of said material and each including an angulated end portion projecting downwardly and laterally of the wall of the screen for attachment to said base.

9. The combination of claim 8 wherein said angulated end portion is apertured for engagement by one of said fasteners and extends downwardly and laterally of the lower ring and edge of said screen.

10. For use on a rotary power-driven base of a cement mixer from which the mixing barrel has been removed, a material sifting attachment comprising a foraminous cylinder, rings encircling the end portions of said cylinder and affixed thereto, and longitudinal bars on the inner periphery of the cylinder affixed thereto and to the rings, said bars including angulated, inwardly inclined apertured end portions projecting from one end of the cylinder and engageable with the base for attachment thereto.

11. For use on a rotary, power-driven base of a cement mixer from which the mixing barrel has been removed, a material sifting attachment comprising a foraminous cylinder including open inner and outer ends, metallic rings encircling the end portions of the cylinder and affixed thereto, longitudinal bars on the inner periphery of the cylinder affixed thereto and to the rings, said bars comprising angulated, inwardly inclined, apertured inner end portions projecting from said inner end of the cylinder and engageable with the base for attachment thereto for mounting said cylinder thereon, and longitudinal angle iron bars mounted on the rings in opposed relation to the first-named bars and having their longitudinal edges affixed to said rings.

References Cited in the file of this patent

UNITED STATES PATENTS

| | | |
|---|---|---|
| 901,519 | Burke | Oct. 20, 1908 |
| 928,965 | Hanna | July 27, 1909 |
| 1,302,697 | Monsette | May 6, 1919 |
| 1,659,557 | Adelman | Feb. 21, 1928 |
| 2,496,077 | Wehner | Jan. 31, 1950 |